United States Patent [19]

Girardin

[11] Patent Number: 4,745,253

[45] Date of Patent: May 17, 1988

[54] DEVICE AND PROCESS DESIGNED TO AUTOMATICALLY HOLD UP AND FIX IN POSITION THE PARTS CUT OUT OF A WORKPIECE DURING ELECTROEROSION MACHINING TO ROUGH DIMENSIONS AND APPLICATION INVOLVING THE AUTOMATIC REMOVAL OF THE CUTOUT PARTS

[75] Inventor: Roger Girardin, Vernier, Switzerland

[73] Assignee: Charmilles Technologies S.A., Geneva, Switzerland

[21] Appl. No.: 940,595

[22] Filed: Dec. 11, 1986

[30] Foreign Application Priority Data

Dec. 12, 1985 [CH] Switzerland .......................... 5320/85

[51] Int. Cl.⁴ .......................... B23H 7/02; B23Q 3/06
[52] U.S. Cl. .................................. 219/69 R; 83/651.1; 204/206; 204/297 R; 219/69 W; 269/296
[58] Field of Search .................. 269/296, 289 R, 292, 269/293, 294; 144/287, 286 R, 286 A; 83/13, 23, 78, 651.1; 219/69 W, 69 R, 69 M, 68; 108/29, 28, 54.1; 204/297 R, 206, 224 M

[56] References Cited

U.S. PATENT DOCUMENTS

| | | | |
|---|---|---|---|
| 1,792,612 | 2/1931 | Staley | 269/296 |
| 2,188,433 | 1/1940 | Friese | 269/296 |
| 3,508,806 | 4/1970 | Hall | 108/28 |
| 3,695,187 | 10/1972 | Weiss | 108/54.1 |
| 3,729,185 | 4/1973 | Roeske | 269/296 |
| 4,484,052 | 11/1984 | Inoue | 219/69 M |
| 4,502,518 | 3/1985 | Lewin | 144/286 R |
| 4,547,646 | 10/1985 | Briffod | 219/69 M |
| 4,566,510 | 1/1986 | Bartlett et al. | 144/286 A |
| 4,571,477 | 2/1986 | Weber | 219/69 M |
| 4,661,678 | 4/1987 | Wavre | 219/69 W |

FOREIGN PATENT DOCUMENTS

80/01366 7/1980 PCT Int'l Appl. ............. 269/289 R

Primary Examiner—Philip H. Leung
Assistant Examiner—Geoffrey S. Evans
Attorney, Agent, or Firm—Gifford, Groh, VanOphem, Sheridan, Sprinkle and Dolgorukov

[57] ABSTRACT

An EDM device includes two support bars bearing on the same reference surfaces as the workpiece. Gibs are provided which engage into driving units able to displace them axially while holding them at a small distance under one support bar. The other support bar carries the receiving units wherein the gibs engage at the end of their stroke. Each driving unit may push the gib engaged therein against the lower surface of the respective bar. Whenever one or several such gibs are stopped under a part cut out of the workpiece, the part will lie thereon and remains fixed even after the electrode has completed a closed path cutout by electroerosion separating the cut-out part from the workpiece. The cut-out part may then be automatically removed by means of a mobile member equipped with a suction cup.

15 Claims, 5 Drawing Sheets

DEVICE AND PROCESS DESIGNED TO AUTOMATICALLY HOLD UP AND FIX IN POSITION THE PARTS CUT OUT OF A WORKPIECE DURING ELECTROEROSION MACHINING TO ROUGH DIMENSIONS AND APPLICATION INVOLVING THE AUTOMATIC REMOVAL OF THE CUTOUT PARTS

BACKGROUND OF THE INVENTION

I. Field of the Invention

The present invention relates to an automatic device and to a process for automatically holding up and fixing in position (immobilizing) the parts cut out of a workpiece when a closed path is electroerosively cut in it, as well as an application involving the automatic removal of the cut out parts.

II. Description of the Prior Art

Such a cutting operation is generally performed by means of a tool-electrode constituted by a wire, a band or a thin rod which is approximately vertical. An electric generator causes eroding discharges between the electrode and the workpiece (or blank) which is thus cut by gradual advance of the electrode along a substantially horizontal path. In order to simplify, the term "cut out part" (or "scrap") as used herein will apply to any part separated from a blank during a cutting operation, whether it be a scrap cut-off from the desired piece or, on the contrary, an internal part, which, in itself, constitutes the desired piece the scrap being then comprised of the remainder of the workpiece.

Whenever a profile is cut along a closed line or when its ends come flush with the edge of the workpiece, it ensues that, upon completion of the operation, the scrap part falls off. The disadvantage lies in the fact that the falling motion starts before the end of the operation, when the scrap part is only held by a narrow bridge material whose resistance finally becomes insufficient to sustain the weight of the scrap part. The latter therefore tends to sink crosswise and pinch the wire while the generator is still operating. The electrode wire thus keeps cutting but it is deviated from its ideal course and causes permanent marks on the mechanical surfaces.

The traditional solutions require the involvement of an operator, i.e. to place blocks under the central piece, shortly before the cutting step is completed. This operation cannot be performed at the beginning of the machining operation since the lower machining head would then collide with the blocks during the cutting process.

The blocks may be replaced by fasteners, parallelograms or telescopic forks but all of these devices either require a manual step or are difficult to automate due to their excessive dimensions.

The device disclosed in U.S. Pat. No. 4,484,052 includes a small magnet dispenser for this purpose, attached to the machining head, but this device is cumbersome due to the fact that it has to lay the magnets along a precut slot whose direction varies constantly. Furthermore, in several applications, the material to be cut is copper, aluminum or another nonmagnetic material. Furthermore, the automatic removal of the cut out parts is made very difficult in the presence of magnets.

SUMMARY OF THE PRESENT INVENTION

The present invention eliminates the above disadvantages and helps retain the cut out part in a simple and efficient manner without requiring the presence of an operator upon completion of the cutting operation, nor a precision setting to align the retaining device in the desired position with reference to the future cut out part, either before or during the cutting operation.

This invention also features the automatic removal of the cut out parts. Indeed, it is preferable to separate the scrap from the machined part prior to the finishing operation. The removal device featured in the present invention makes it possible to finish the surface of the recess thus obtained, or to rough out a second recess in the workpiece, these roughing out or finishing operations being automatically sequenced without requiring the presence of an operator.

Another advantage of the present invention lies in the elimination of machining defects due to a premature fall of the piece cut out from the blank.

Therefore, the invention is a process designed to automatically hold up and fix in position a part cut out of a workpiece machined to rough dimensions when a closed path is cut by electroerosion, the resulting cut out part having a flat base. At least two bars, each offering a flat surface, are positioned in such a manner that these flat surfaces are in the same place as the lower surface of the cut out part to be separated. At least one mobile gib is moved, after partial completion of the cutting operation, so that it crosses under both coplanar surfaces of the two bars and under the lower surface of the cut out part. The at least one gib is then pressed against the lower surface of both bars before the completion of the cutting operation. Preferably the gib's displacements and the pressure applied to it are controlled with reference to the relative displacements of the workpiece and of the electrode wire used for the cutting operation, so as to avoid any collision between the electrode and the gib.

The present invention is also an application of a process designed to automatically hold up and fix in position a part cut out of a workpiece machined to rough dimensions when a closed path is cut in the workpiece by electroerosion, and more specifically to the automatic removal of the cut out part thus held up. A suction cup is brought in contact with the cut out part while it is still being kept in the workpiece. A partial vacuum is then created between this suction cup and the cut out part, and the suction cup/cut out part assembly moved in such a way as to completely extract the cut out part from the workpiece. This assembly is then displaced with reference to a tray located outside of the machining area, so as to bring it above or into the tray. An adequate pressure is then reestablished between the suction cup and the cut out part to separate them from one another.

This solution altogether offers an accurate, sturdy and easy construction, particularly when using pneumatically or hydraulically activated devices that are controlled by a numerical control system which also controls the cutting operation itself.

BRIEF DESCRIPTION OF THE DRAWING

The present invention may present an infinity of constructions, a few of which are illustrated as examples on the attached, schematic drawings where:

FIG. 1 is a generally schematic elevation of a device as described in the invention. Reference character 1 refers to two columns made of granite or similar material and onto which a support plate 2 is attached. The columns 1 are steadily fastened to the X-Y cross motion plate (not represented herein) of an electroerosion machine (also not represented). It is also possible within the present invention that the plate is fixed and the wire mobile along X-Y. Any other combined solution offering a relative motion X-Y of the wire with reference to the workpiece is also feasible. Each support plate 2 includes a bossing 3. Both bossings 3 are located in the same plane and support the workpiece 4 which is illustrated in a partially exploded view. Furthermore, the piece 4 is supported by retainer keys 25 (see FIG. 2) screwed against the flat internal faces of two support bars 8 and 9 which also rest on bossings 3, on either side of the piece 4. In order to simplify the description, it is assumed that the workpiece 4 is essentially a parallelepiped including a single flat lower face, but this is not absolutely necessary. A shaded area indicates the location of a portion 5 of the workpiece 4 to be cut following a course of cutting 7, using the electrode wire sketched in 6. As soon as the course 7 is completed, the portion 5 becomes a cut out part which is no longer supported by the bossings 3 nor by retainer keys 25 and which, therefore, will fall to the bottom of the electroerosion tank (not shown) if it is not properly retained. In order to prevent the cut out part 5 from falling and also to avoid excessive mechanical stress on the narrowing neck connecting it to the rest of the workpiece 4 4 just before completion of course 7, it is necessary to keep the cut out part 5 in the exact position that it occupied before the cutting operation. A set of members have therefore been provided, including two support-bars 8 and 9 with flat lower surfaces resting on bossings 3, on either side of piece 4. The lower faces (not visible on the drawing) of these bars are therefore located in the same plane as the edges of the lower face (also not visible) of workpiece 4 since they rest on the same coplanar bossings 3. Straight gibs 11, 12 and 19 with flat upper surfaces are mobile in the direction of arrows A and R, and are maintained in the vicinity of the lower faces of support bars 8 and 9 by members 13 through 18 attached to either of said bars. Members 13, 14 and 17 are driving units individually able to drive, forward in the direction of arrow A and backward in the direction of arrow R, the gib (11, 12 or 19) engaged therein while keeping it close (i.e. a few tenths of millimeters) to the lower face of support bar 8. When the gibs are moved in the direction A, each one engages at the end of its stroke into one of the members 15, 16 and 18 attached to the support bar 9 and representing the gibs receiving units. As indicated in the comprehensive description hereinafter, each driving unit further comprises a device designed to lift the gib engaged therein and to firmly press it against the lower face of bar 8. This arrangement allows both for an easy sliding of the gibs for their axial positioning and, when required, an accurate immobilization of said gibs by pressing them against the lower face of the bar.

Figure 1:
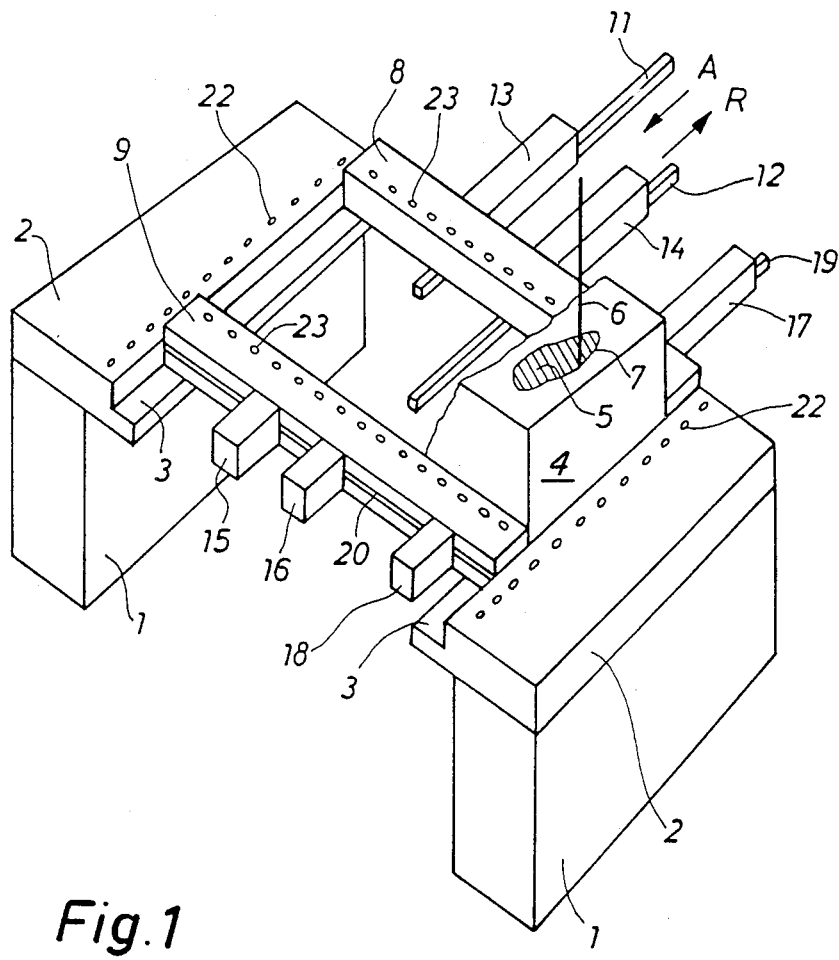
FIG. 1 is a schematic elevation of a device as described in the invention.

The receiving units 15, 16 and 18 respectively include a similar device, able to press the gib engaged therein against the lower face of bar 9. A slide 20 is provided in each of bars 8, 9 (only one of the slides 20 being visible in FIG. 1) to allow the units to slide along the bars, thus making it possible to select the exact position desired for the gibs. Once positioned at the selected location, each unit may be immobilized by means of fasteners such as screws, clamps or retainer keys (not shown on the drawing) or the like. The openings 23, drilled in bars 8, 9 allow for an easy mounting of these fasteners and of the retainer keys 25 (FIG. 2) used to hold workpiece 4. Likewise, two sets of openings 22 provided in the support plates 2 allow for an easier mounting of the bars 8 and 9 on the bossings 3, on either side of the workpiece 4, with the retainer keys 26 (FIG. 2).

Figure 2:
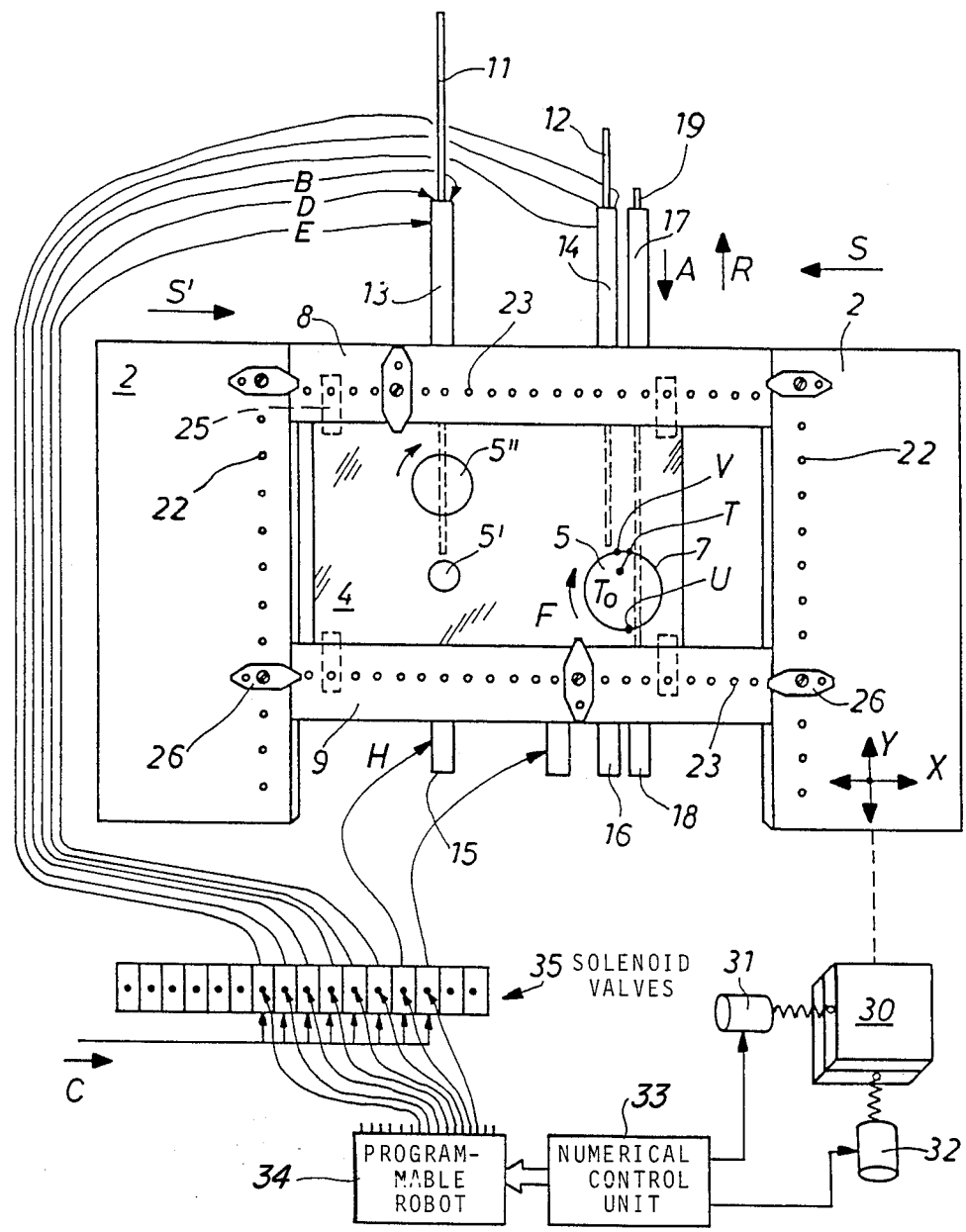
FIG. 2 is a plane view of a device similar to that of FIG. 1, complete with the schematic illustration of a control system.

FIG. 2 is essentially a plane view of the device illustrated on FIG. 1 and also includes a schematic representation of the gib motion control system. For more clarity, some mobile parts (such as gib 12 and the units which support it) have slightly different positions on both Figures.

Reference character 30 refers to the schematic illustration of the X-Y cross motion plate which provides the relative motions, between the electrode wire 6 and workpiece 4, required to cut the latter with the former along the course 7. The plate 30 is driven by the motors 31, 32 which are controlled by a numerical control unit 33. The latter further controls a programmable robot 34 which interfaces with a solenoid valve battery 35. These valves are fed with compressed air or hydraulic fluid (Arrow C) from a source which is not shown on the drawing, while their outlines are connected by pipes with the driving and receiving units, to pneumatically or hydraulically activate the driving and receiving units. As an example, in driving unit 13, the pipe B controls the advance of the gib 11 engaged in that unit, the pipe D controls the backward motion of said gib and the pipe E raises that same gib to press it against the bar 8. Likewise, the pipe H controls the rising of gib 11 when engaged in the receiving unit 15. The other units are similarly controlled by pipes which are not represented on the drawing so as to simplify it.

The following is the description of the sequence of operations to be performed to cut out the scrap part 5 along the complete course 7 following the direction indicated by arrow F. Prior to machining, the units 14, 16, 17, 18 are approximately positioned at the locations indicated on FIG. 2. The units, positions may be predetermined from the workpiece drawings and automatically set if desired. The gibs 12 and 19, engaged in units 14 and 17 are retracted to avoid sliding under the cut out part 5. The electrode wire is slipped in a traditional manner through a start hole $T_o$ and a first cutting operation is performed from $T_o$ to point T located on the cutting course 7. The cutting operation is then performed clockwise from T to point U located slightly on the left of the position that would be occupied by the gib 19 if the latter was in full forward position (downward in FIG. 2). The remaining portion U-T of the cutting course may be covered without having the wire cross that position. This allows the gib 19 to be advanced by means of driving unit 17 toward arrow A until it engages in the receiving unit 18. During this forward motion, the driving unit keeps the gib at a short distance, i.e. a few tenths of millimeters under the lower face of the workpiece 4. The gib 12 is then pressed against bars 8 and 9 against the lower face of the scrap in the same manner as gib 19. The only remaining operation is to cut along the last portion V-T in order to complete the operation. Since the scrap part 5 is held by gibs 12 and 19 in the exact position that it occupied before the cutting operation, it does not fall or sink during completion of the cutting operation.

It is, of course, not necessary to interrupt the cutting operation as the gibs advance or rise. It is also obvious that said advance and rise will generally be automatically controlled by the same numerical control unit 33 which controls the electroerosion and the motions of the wire with reference to the workpiece 4. The cutting of other scraps such as those indicated in 5' and 5" is performed in a similar manner.

Although the above described gib positioning method, by axial displacement, offers an advantage when it is necessary to use several gibs side by side, it would also be possible to position the gibs crosswise, in the direction of arrows S or S'. Each pair comprised of a driving unit and a receiving unit will then be replaced by a pair of mobile units synchronously moving, one along bar 8 and the other along bar 9, both carrying a gib between themselves, very much like a traveling crane. This solution requires less space in the tank since the gibs may be pulled out of the overhanging surface of workpiece 4 without practically occupying any space beyond the overhang of the assembly comprised of bars 8,9 and support plate 2.

Figure 3:
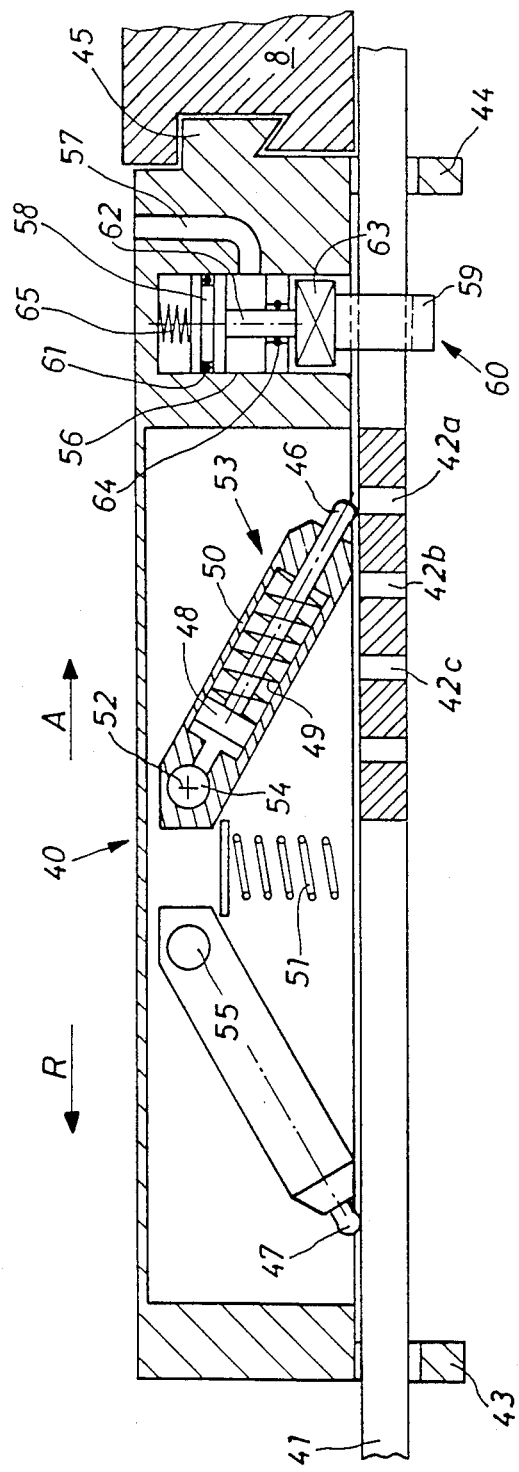
FIG. 3 is a partial axial section of a driving unit.

FIG. 3 illustrates a partial axial section of a driving unit whose housing 40 carries two guides 43, 44 wherein a rectangular section gib 41 is engaged. The housing hangs, through dovetail 45, from a slide grooved in bar 8. The gib 41 includes equally spaced holes 42a, 42b, etc. It is held beneath unit 40, a few tenths of millimeters from the bottom thereof and at a similar distance from the above lower face of bar 8, by two guides 43, 44 built in the housing of the unit and within which it slides axially. The advance (arrow A) and backing (arrow R) of the gib is obtained through the action of a push rod 46 and 47 respectively. The rod 46 is rigidly mounted with a piston 48 mounted in a cylinder 50 and pushed to the bottom thereof by a return spring 49.

The piston cylinder assembly acts as a trigger 53 rotating freely around a horizontal shaft 52 whose lower portion rests on the gib by means of the free end of rod 46.

Compressed air or hydraulic fluid may be brought in the trigger 53 by a pipe (not shown on the drawing) which enters into the trigger 53 in alignment with the shaft thereof so as not to interfere with the rotation of the trigger 53 around that shaft. The trigger 53 therefore rests by gravity on gib 41. If necessary, a spring 51 is provided to increase the pressure applied to the gib by the trigger 53.

Inside the trigger 53, the pipe opens into a recess 54 connected with the vacuum created above the piston. If, in the position illustrated on the drawing, the air or hydraulic fluid pressure brought to recess 54 is increased until the piston compresses the return spring 49 and the rod 46 outside of the trigger 53, the end of the rod will first engage in hole 42a and will then push the gib 41 to the right until the piston 48 reaches the end of it stroke. If, afterward, the compressed air or fluid pressure is reduced to the point where the spring 49 returns the piston to the bottom of the cylinder 50, the rod 46 will drag to the left, onto gib 41, without displacing the latter due to its much greater weight, to finally engage in hole 42b which, at this point, will be further to the right than illustrated on FIG. 3. High and low pressures alternating in recess 54 will therefore gradually move the gib 41 to the right. A similar trigger 55, directed to the left, operates in a similar fashion to gradually move the gib 41 backward to the left.

On the right hand side of driving unit 40, a device is provided to stop the gib 41 by pushing it firmly against the lower face of bar 8. This device comprises a vertical cylinder 56 provided in the housing of unit 40, a feed pipe 57 opening onto the cylinder 56, as well as a striker 60 used to lock the gib. The striker includes a piston 58, mobile within the cylinder 56 and equipped with a seal 61. The piston 58 is borne by a cylindrical rod 62 rigidly mounted with a prismatic member 63 extended by a yoke 59 through which the gib 41 travels. A ring 64, fixed with reference to the driving unit housing 40, surrounds rod 62 in such a fashion as to define a chamber located under the piston 58, in which compressed air or a hydraulic fluid may be sent through the pipe 57 to push the striker 60 upward against the effort applied by a return spring 65. The yoke 59 is then pulled upward; it thus clamps the gib 41 and presses against the internal upper face of the guide 43 and against the lower face of bar 8, which accurately locks the gib in operating position.

Figure 4:
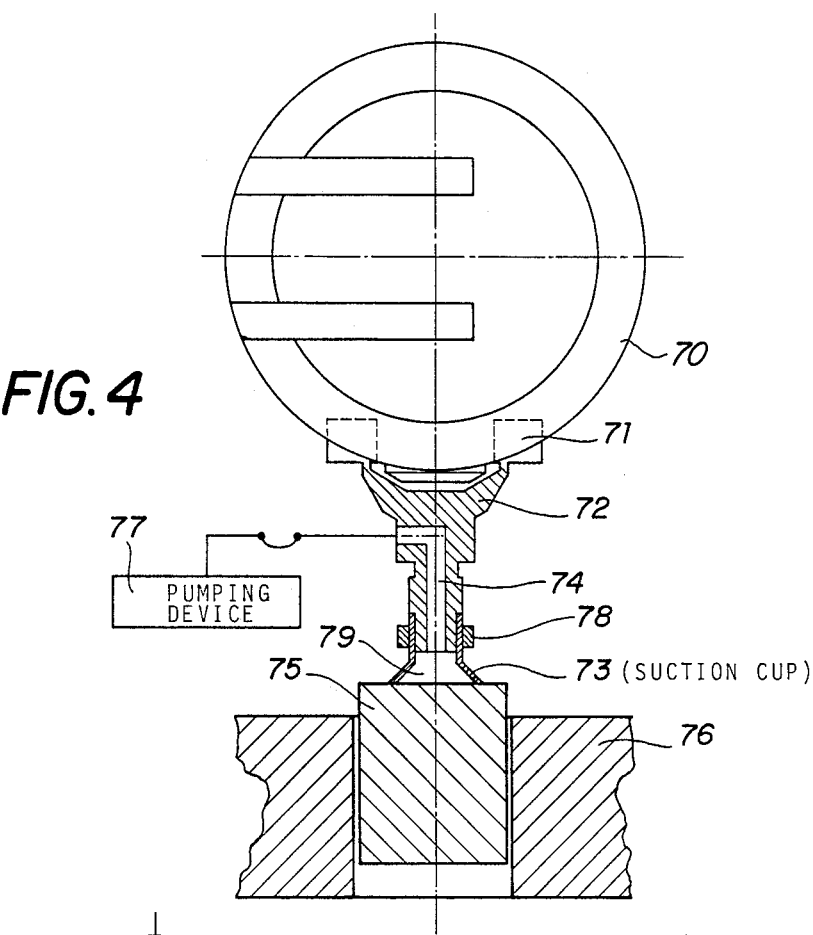
FIG. 4 illustrates one of the several possible constructions for an automatic scrap removal device.

FIG. 4 illustrates an automatic cut out parts removal system operating after the cutting operation. The machining head 70 is equipped, on its lower portion, with an automatic lock system 71 (not illustrated here for clarity purposes), designed to automatically lock a detachable part 72 by traditional means. At the end opposite to this attachment, the said part 72 includes a rubber suction cup 73 held in place by a shrink ring 78. It is crossed through by a channel 74 connected with a fluid vacuum or feed device 77 opening into the end equipped with the suction cup 73.

Since the scraps 75 to be removed may vary in size, it is desirable to provide several suction cup holders 72, of different sizes if convenient or desirable, as well as suction cups 73 of different dimensions and adapted to the size of scraps 75 to be removed. These suction cup holders 72 are stored on a rack 80 which remains fixed with reference to the machining tank 83 and moves together therewith (FIG. 6). As soon as the closed course 7 is cut in the workpiece 76, the numerical control unit 33 of the machine deactivates the cutting electrode wire, controls the lowering of the level of the dielectric liquid in the machining tank so as to let the upper face of the scrap emerge, and selects the suction cup holder 72 holding a suction cup 73 designed for the weight and size of the scrap 75 to be removed. This control unit 33 then activates the cross-motion plate 82 by programming (by means of traditional software designed for the automatic change of tools) displacement of the tank 83/rack 80 assembly toward the machining head 70 as well as positioning the selected cup holder 72 in front of the machining head 70. The numerical control unit 33 then induces the vertical displacement of the head 70 which is thus lowered and brought in contact with the suction cup holder 72. Under the action of the locking device 71, the suction cup holder 72 automatically attaches under the head 70 as soon as contact is effective. By inducing the motion of the tank 83 by means of the cross-motion plate 82, the numerical control then programs the positioning of the workpiece 76/cut out part 75 assembly locked in motion with the tank 83, so that the suction cup 73 is moved over the cut out part 75 (FIG. 5a).

This control then induces the vertical displacement of the head 70 toward the scrap 75. When the lower portion of the suction cup 73 comes very close, a few millimeters for instance, to the upper face of scrap 75, the pumping action of the device 77 is automatically started, thus creating a partial vacuum in the space 79 between the suction cup 73 and the upper face of scrap 75, the latter sticking to the suction cup 73 by suction (FIG. 5b).

Figures 5A, 5B, 5C:
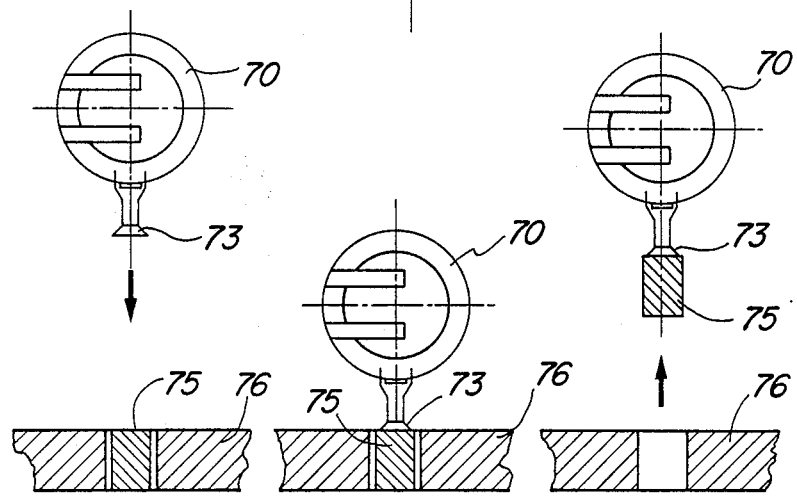
FIG. 5 is an operation diagram thereof.
Figure 6:
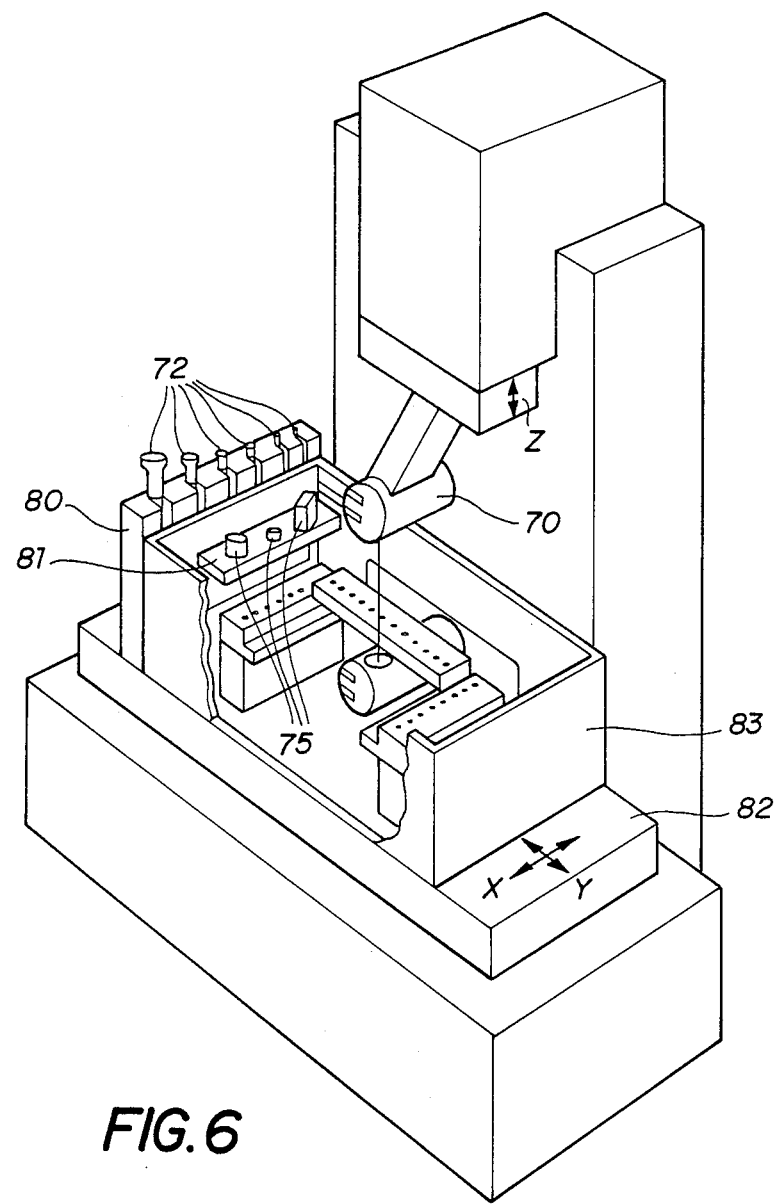
FIG. 6 is a schematic illustration of an electroerosion cutting machine wherein neither the workpiece nor the structure retaining the cut out parts in position have been represented for more clarity.

By again programming a vertical displacement of head 70, the scrap 75 is entirely withdrawn out of its recess within the work piece 76 (FIG. 5c). Then, while it is still being held by the suction cup 73, the cut out parts take-up container 81 is positioned (FIG. 6) under the head 70. This operation is obtained through the plate 82, the motion of container 81 being also coupled with that of tank 83. The scrap 75 is released from the suction cup 73 by automatic injection of the fluid from the device 77, the fluid being reinjected in chamber 79 through the channel 74.

The machining head 70 may then either dispose of another scrap after laying the suction cup holder 72 down and selecting another one, or lay the suction cup holder 72 down and continue the machining operation after programming the automatic wire moving operation, and machine operations.

The suction cup is desirably made of an elastomer material which allows for the disposal of a scrap even if it is not ferromagnetic and even if its surface is not smooth.

In the above described device, it is of course within the scope of the present invention to replace the holder 72-suction cup 73 assembly by a magnet, by a device comprising a pick-up attachment to grip the scrap 75, or even by a device capable of drilling a hole through the scrap 75, tapping the latter and handling the scrap with a single tool.

In the case of relatively heavy scrap, several suction cups may be used in combination, whether individually attached to a different suction cup holder or to a suction cup holder designed to hold several suction cups.

The suction cup device can be attached to something other than the upper machining head 70, for instance to the end of an independent arm which is able to move in both a horizontal and a vertical plane, and which can be activated by the numerical control unit 33. The relative motions between the end of that arm and the rack 80, the container 81 and the scraps to be disposed of, may be programmed if desired through the EDM machine's numerical control unit 33, using traditional, automatic tool changing systems.

It is also possible to provide for racks equipped with suction cup holders as well as take-up containers that are mobile with respect to the machining tank. The rack, for instance, may be mobile in the x direction, whereas the arm onto whose end the suction cup holders are attached may travel along a semi-circle in the horizontal plane, and move vertically as well.

The rack does not have to be linear and may have the shape of a carrousel for instance, such as the one described in European patent application No. 132 599. It can be located outside of the machining tank and move independently from the latter.

Other devices may be used instead of the take-up container attached to the machining tank, such as, for instance, a device magnetically attracting the scraps as they are released by the handling device, or a traditional conveyor belt located within the machining tank and arranged in such a way as to take the scraps to a tray located outside of the machine, or even a conveyor belt capable of advancing above the tank and under the device which holds the scrap removed from its former location in the machined part, and which is then capable of reversing its travel so as to clear the machined area and to put the scrap in an appropriate outside tray.

The foregoing clearly indicates that a variety of designs may be employed in the present invention.

I claim:

1. A process designed to automatically hold up and fix in position a part cut out of a workpiece machined to rough dimensions when a closed path is cut in said workpiece by electroerosion, said part having a flat base, wherein at least two bars, each offering a flat surface, are positioned in such a manner that said flat surfaces are in the same plane as the lower surface of said part and wherein at least one mobile gib is moved, after partial completion of said cutting, so that said gib crosses under both coplanar surfaces of said two bars and under the lower surface of the part and is then pressed against said lower surfaces of both bars before completion of said cutting.

2. A process according to claim 1, wherein said gib moves longitudinally.

3. A process according to claim 1, wherein said gib moves laterally.

4. A process according to claim 1, wherein movement of said gib is pneumatically or hydraulically controlled.

5. A process according to claim 1, wherein said bars are positioned by laying their ends down on coplanar flat surfaces.

6. A process according to claim 5, wherein said workpiece offers a lower flat surface which lies in the same place as said surfaces used to position said bars.

7. A process according to claim 1, wherein movement of said gib and the pressure applied thereto are controlled with reference to the relative displacements of the workpiece and of an electrode wire used for the cutting operation, so as to avoid any collision between said electrode and said gib.

8. A device for automatically holding up and immobilizing a part separated from a workpiece machined to rough dimensions when a closed path is cut in said workpiece by electroerosion, characterized by comprising a gib, at least two bars offering coplanar lower surfaces, and at least one gib-holding member mounted on each bar and each of said members is adapted to press said gib against said each bar.

9. A device according to claim 8, wherein at least one of said gib-holding members embodies a driving unit designed to axially move said gib under said bar carrying said driving unit, and wherein another of said gib-holding members embodies a receiving unit arranged in such a way that the gib is engaged therein upon said axial movement.

10. A device according to claim 9, wherein said driving unit includes a pneumatically or hydraulically controlled mechanism to gradually move said gib lengthwise.

11. A device according to claim 10, wherein at least two of said gib-holding members constitute a pair of mobile units moving respectively along one of said bars.

12. A device according to claim 11, wherein each mobile unit includes a pneumatically or hydraulically controlled mechanism to gradually move sid unit along one of said bars.

13. A device according to claim 10, wherein said pneumatically or hydraulically controlled mechanism comprises two pneumatically or hydraulically controlled triggers, each comprising a cylinder-piston assembly fed with fluid from a separate pipe, one end of each trigger being rotatably mounted around an approximately transverse pin with reference to the direction of said gradual motion, said each trigger being engaged in such a manner that when pressure levels alternate within the pipe, an end opposite said one end presses repeatedly on a series of stops aligned on an elongated member so as to gradually displace said elongated member relative to said each trigger, in one direction for a given trigger and in the opposite direction for the other.

14. A device according to claim 8, wherein said gib-holding members include pneumatically or hydraulically controlled means to press said gibs against said bars.

15. A device according to claim 9, characterized by a control system activating at least one driving unit and one receiving unit so that, in the course of the machining operation, said gib handled by said two gib-holding members does not collide with a cutting electrode performing said electroerosion.

* * * * *